United States Patent [19]
Buchele et al.

[11] 3,856,022
[45] Dec. 24, 1974

[54] SHELLING MECHANISM

[75] Inventors: Wesley F. Buchele, Ames, Ohio; Ali R. Mahmoud, Khartoum North, Sudan

[73] Assignee: Iowa State University Research Foundation, Inc., Ames, Iowa

[22] Filed: July 26, 1973

[21] Appl. No.: 382,668

[52] U.S. Cl. .................................. 130/6, 130/21
[51] Int. Cl. ........................................ A01f 11/06
[58] Field of Search ............................. 130/6, 21

[56] References Cited
UNITED STATES PATENTS

| | | | |
|---|---|---|---|
| 199,496 | 1/1878 | Blair | 130/6 |
| 361,644 | 4/1887 | Pitts et al. | 130/6 |
| 3,448,566 | 6/1969 | Van der Lely | 130/21 |
| 3,662,762 | 5/1972 | Brass | 130/6 |

*Primary Examiner*—Antonio F. Guida
*Attorney, Agent, or Firm*—Zarley, McKee, Thomte & Voorhees

[57] ABSTRACT

A corn shelling mechanism comprising an elongated concave means having one end thereof positioned below a rotatable cylinder. A continuous belt sheller is positioned above the concave in a spaced relationship with respect thereto. The corn ears are fed to the rotating cylinder by a feeder housing means with the ear receiving one or more impacts by the rasp bar of the cylinder before it travels out of range of the cylinder. The partially shelled ear passes between the belt sheller and the concave with the belt sheller urging the ears into engagement with the concave to complete the shelling operation.

6 Claims, 2 Drawing Figures

PATENTED DEC 24 1974 3,856,022

SHELLING MECHANISM

BACKGROUND OF THE INVENTION

This invention relates to a shelling mechanism and more particularly to a corn shelling mechanism. Research indicates that there is an increase in kernel damage to corn proportional to the distance the kernels have traveled down the shelling crescent of a cylinder concave shelling mechanism. High speed photography has shown that shelling becomes very easy once the first few kernels have been detached from the ear by impact. The high impact forces applied to the ear by the conventional cylinder concave shelling mechanism results in extensive kernel damage.

Therefore, it is a principal object of the invention to provide an improved corn shelling mechanism.

A further object of the invention is to provide a corn shelling mechanism wherein kernel damage is reduced.

A further object of the invention is to provide a corn shelling mechanism wherein a high speed cylinder initiates the shelling operation and a belt sheller mechanism completes the shelling operation.

A further object of the invention is to provide a corn shelling mechanism which quickly and efficiently shells the ear with low kernel damage.

A further object of the invention is to provide a corn shelling mechanism which is economical of manufacture, durable to use and low in energy consumption.

These and other objects will be apparent to those skilled in the art.

DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

BRIEF DESCRIPTION OF THE PREFERRED EMBODIMENT

Figure 1:
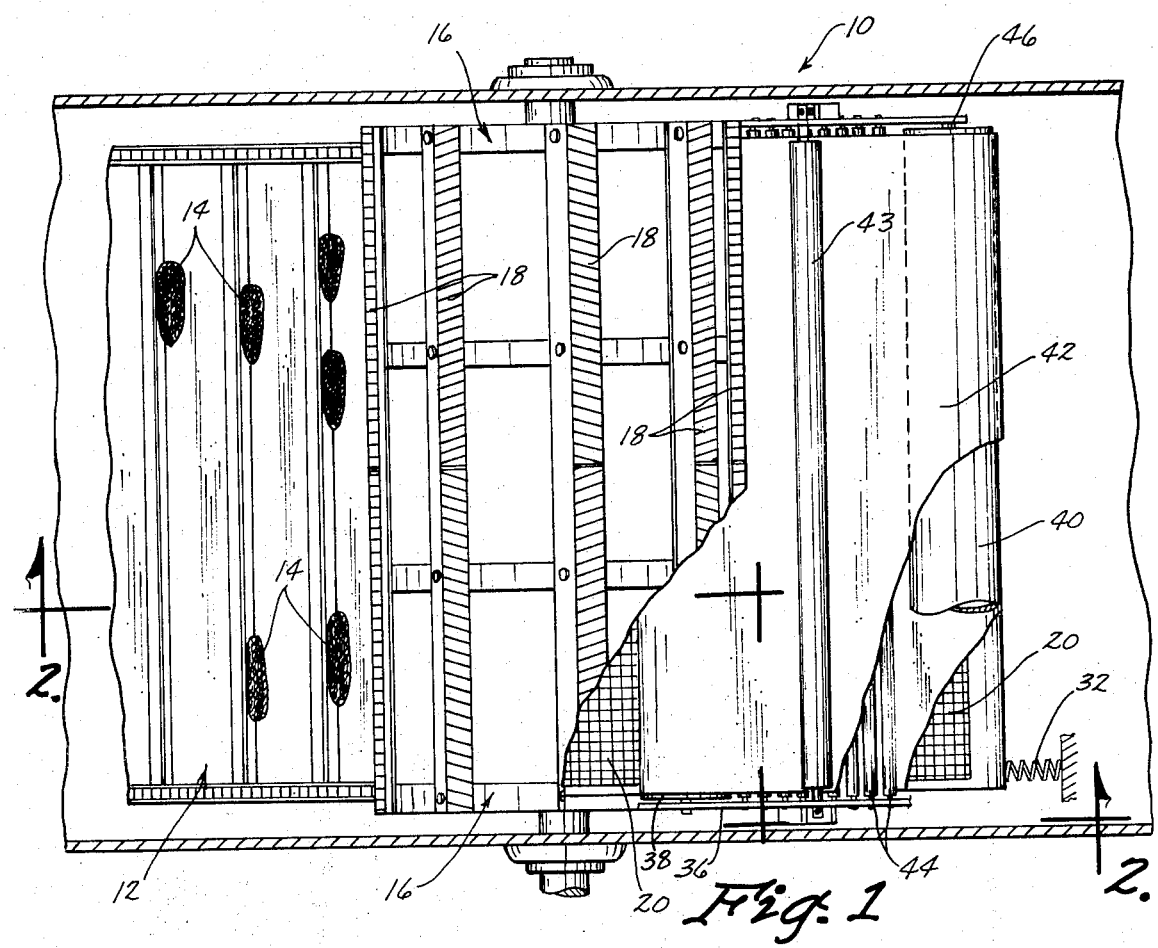
FIG. 1 is a top view of the shelling mechanism with portions thereof cutaway.

The corn shelling mechanism of this invention is referred to generally by the reference numeral 10. The numeral 12 refers to a conventional feeder housing apparatus adapted to deliver the ears 14 to a rotatable cylinder 16 having a plurality of spaced apart rasp bars 18 provided thereon.

Figure 2:
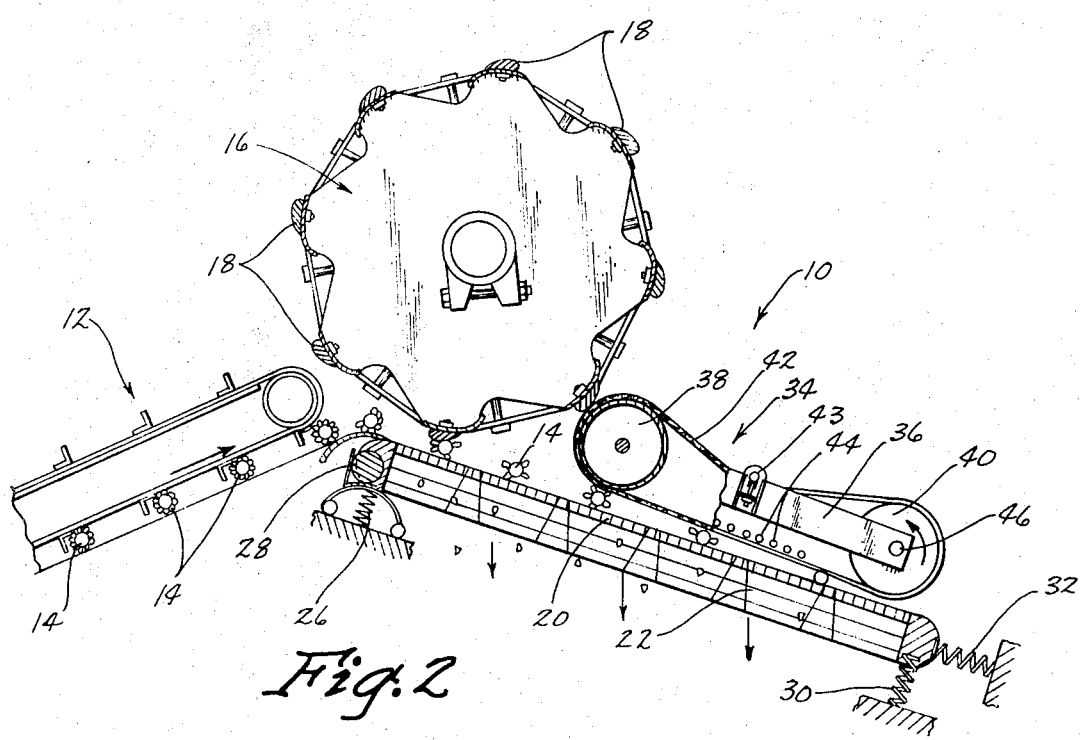
FIG. 2 is a sectional view taken on lines 2—2 of FIG. 1.

The numeral 20 refers to a substantially straight concave having a plurality of shelling grate sections 22 provided thereon. If desired the concave 20 may be curved at a point near its upper end to increase the angle of contact between the ear and cylinder 16. The upper end of the concave 20 is mounted to the combine housing 24 by a spring means 26 as seen in FIG. 2. The numeral 28 refers to a roller and retainer mechanism provided at the upper end of the concave 20. The numerals 30 and 32 refer to lateral compression springs and longitudinal compression springs respectively which mount the lower end of the concave as seen in FIG. 1.

The numeral 34 refers generally to a belt sheller mechanism comprising a frame means 36 having a pair of rollers 38 and 40 rotatably mounted at the upper and lower ends thereof respectively. A continuous belt 42 extends around the rollers 38 and 40 and passes beneath a belt tightener mechanism 43. A plurality of supporting rollers 44 are provided as seen in FIG. 1 to prevent the lower portion of the belt from being deflected upwardly. The shaft 46 is operatively connected to a source of rotational power to operate the belt sheller mechanism.

The normal method of operation is as follows: The ears 14 are fed to the rotating cylinder 16 by the feeder housing 12 in conventional fashion. The ear receives one or more impacts by the rasp bar of the cylinder before it travels out of range of the cylinder. The rasp bar should partially shell several rows of kernels at this location. The ear, while rolling down the concave 20, comes under the influence of the belt sheller mechanism 34. As seen in the drawings, the concave 20 is positioned below the belt 42 and is made up of grated sections 22 so that the grain, once the belt begins the shelling process, drops through the concave as it is rolled down the concave by the belt sheller and separated from the ear. As seen in FIG. 2, the space between the belt 42 and the upper surface of the concave 20 becomes progressively smaller. The belt 42 urges the ear (often rolling it) into engagement with the upper surface of the concave to complete the shelling of the ear. Little or no damage is caused by the belt to the shelled corn. The cylinder 16 provides high impact forces to initiate shelling and the belt provides low impact shelling to complete the shelling of the partially shelled ear. The cylinder and belt shelling mechanism combines the desired impact forces to start shelling and low impact force to complete the shelling with low damage shelling occuring. Inasmuch as the belt sheller is shelling partially shelled ears, the life of the belt should be substantially greater than the regular belt shellers.

Thus it can be seen that a unique corn shelling mechanism has been provided wherein a rotating cylinder and a belt sheller mechanism cooperate to efficiently shell corn with very little kernel damage occurring. Therefore, the invention accomplishes at least all of its stated objectives.

We claim:

1. A corn shelling mechanism comprising,
   an elongated concave means having first and second ends,
   a powered rotatable cylinder means positioned above said concave means adjacent said first end for partially shelling the ears passing therebetween,
   means for conveying the ears to said cylinder means,
   a powered belt sheller positioned above said concave means in a spaced relationship with respect thereto, said belt sheller extending from said cylinder means towards said second end, said belt sheller urging the partially shelled ears to engagement with said concave means to complete the shelling operation, said concave means being straight and continuous beneath said cylinder means and said belt sheller.

2. The corn shelling mechanism of claim 1 wherein said concave means is laterally and longitudinally spring mounted.

3. The corn shelling mechanism of claim 1 wherein said belt sheller comprises means for yieldably urging the partially shelled ears into engagement with said concave means.

4. The corn shelling mechanism of claim 1 wherein said belt sheller comprises means for yieldably rolling partially shelled ears into engagement with said concave means.

5. The corn shelling mechanism of claim 1 wherein said belt sheller has upper and lower ends, the distance between said belt sheller and said concave means progressively decreasing from the upper end of said belt sheller to the lower end of said belt sheller.

6. The corn shelling mechanism of claim 1 wherein said concave means comprises a plurality of shelling grates.

* * * * *